(12) United States Patent
Park

(10) Patent No.: US 8,549,419 B2
(45) Date of Patent: Oct. 1, 2013

(54) MOBILE TERMINAL PROVIDING GRAPHIC USER INTERFACE AND METHOD OF PROVIDING GRAPHIC USER INTERFACE USING THE SAME

(75) Inventor: Yeon Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 12/796,398

(22) Filed: Jun. 8, 2010

(65) Prior Publication Data

US 2010/0251186 A1    Sep. 30, 2010

Related U.S. Application Data

(63) Continuation of application No. 11/410,312, filed on Apr. 25, 2006, now Pat. No. 7,761,801.

(30) Foreign Application Priority Data

Apr. 26, 2005  (KR) ................................. 2005-34542
Apr. 27, 2005  (KR) ................................. 2005-34952

(51) Int. Cl.
*G06F 3/048* (2013.01)

(52) U.S. Cl.
USPC ............ 715/764; 715/821; 345/173; 345/473

(58) Field of Classification Search
USPC ........................................................ 715/764
See application file for complete search history.

(56) References Cited

U.S. PATENT DOCUMENTS

| | | | |
|---|---|---|---|
| 6,278,455 B1 | 8/2001 | Baker | |
| 6,448,987 B1 | 9/2002 | Easty et al. | |
| 6,559,872 B1 | 5/2003 | Lehikoinen et al. | |
| 6,721,953 B1 * | 4/2004 | Bates et al. | 725/39 |
| 6,774,900 B1 * | 8/2004 | Kubota et al. | 345/473 |
| 2001/0028367 A1 | 10/2001 | Saitoh et al. | |
| 2002/0075333 A1 | 6/2002 | Dutta et al. | |
| 2002/0196266 A1 | 12/2002 | Mou et al. | |
| 2004/0150664 A1 * | 8/2004 | Baudisch | 345/740 |
| 2005/0223338 A1 * | 10/2005 | Partanen | 715/821 |
| 2006/0174839 A1 * | 8/2006 | Ely | 119/219 |
| 2006/0242596 A1 | 10/2006 | Armstrong | |

FOREIGN PATENT DOCUMENTS

| | | |
|---|---|---|
| JP | 05-134839 | 6/1993 |
| JP | 07-281864 | 10/1995 |
| JP | 1999-232009 | 8/1999 |
| JP | 11-327749 | 11/1999 |
| JP | 2000-222086 | 8/2000 |

(Continued)

*Primary Examiner* — Nicholas Augustine
*Assistant Examiner* — Andres E Gutierrez
(74) *Attorney, Agent, or Firm* — McKenna, Long & Aldridge, LLP

(57) ABSTRACT

A mobile terminal providing a graphic user interface and method of providing a graphic user interface are disclosed. In one embodiment a mobile terminal may comprise a control unit, a touch screen display unit coupled to the control unit, and a memory storing instructions to be executed by the control unit. In one embodiment a method may comprise displaying and then moving one or more icons around the screen of the mobile terminal, detecting a designation of a point on the screen, and executing a predefined action based on a distance from a location of the designated point to a location of at least one of the icons. Another embodiment may detect an application related event, display an indicator icon, and execute a predefined action in response to the event detection.

19 Claims, 10 Drawing Sheets

(56) References Cited

FOREIGN PATENT DOCUMENTS

| JP | 2002-269006 | 9/2002 |
| JP | 2003-256867 | 9/2003 |
| JP | 2003-298715 | 10/2003 |
| KR | 1020050034968 | 4/2005 |
| WO | WO 2004/040461 | 5/2004 |

* cited by examiner

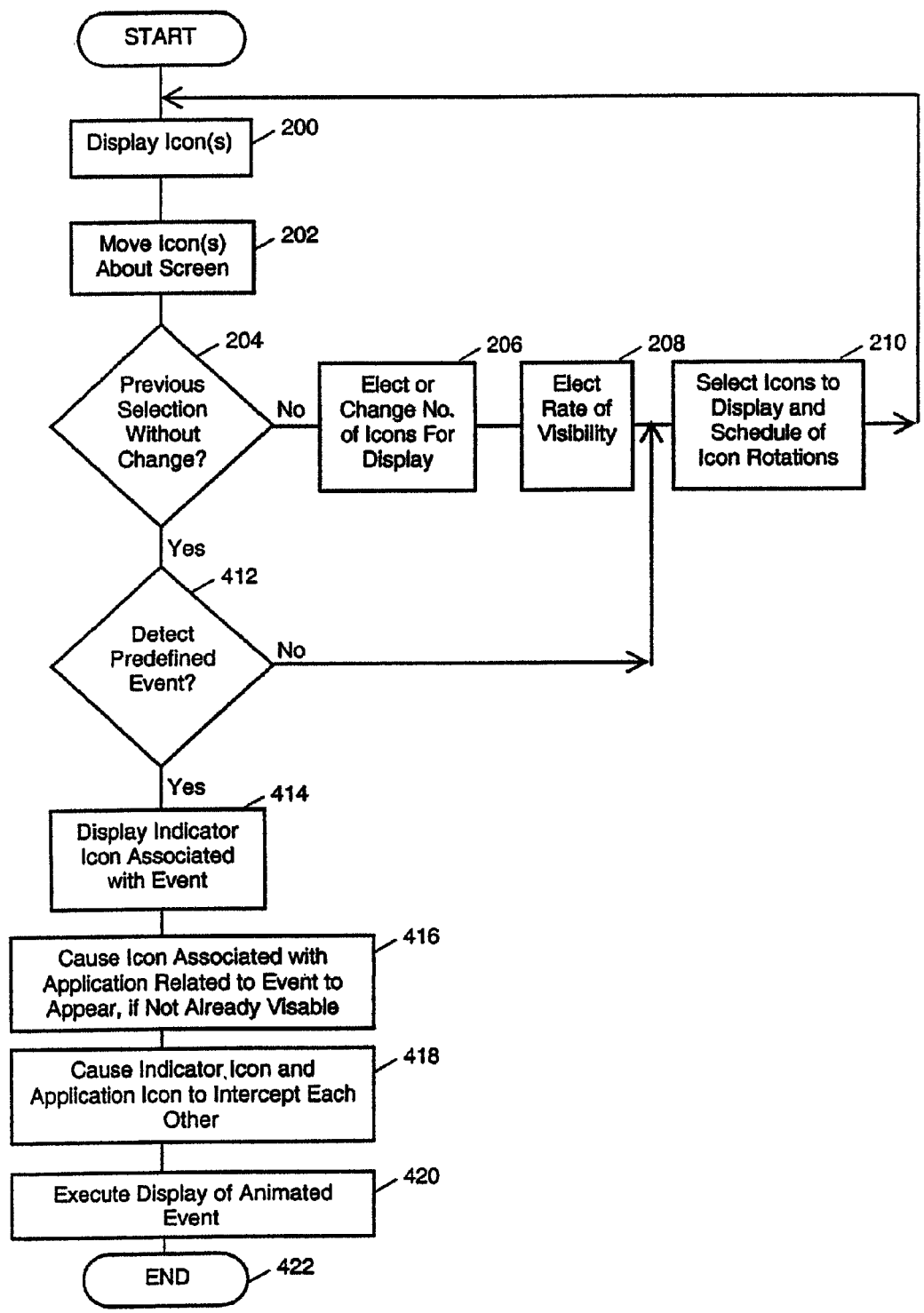

MOBILE TERMINAL PROVIDING GRAPHIC USER INTERFACE AND METHOD OF PROVIDING GRAPHIC USER INTERFACE USING THE SAME

This application is a continuation of U.S. application Ser. No. 11/410,312, filed on Apr. 25, 2006 now U.S. Pat. No. 7,761,801 and claims the benefit of Korean Patent Application No. 10-2005-34542, filed on Apr. 26, 2005 and Korean Patent Application No. 10-2005-34952, filed on Apr. 27, 2005, both of which are hereby incorporated by reference for all purposes as if fully set forth herein.

BACKGROUND OF THE INVENTION

1. Field of the Invention

The present invention relates to a mobile terminal using a touch screen display, and more particularly, to a mobile terminal providing a graphic user interface that may be manipulated with a pointed instrument via the touch screen display. Methods of use of the graphic user interface on such a mobile terminal are also presented.

2. Discussion of the Related Art

Generally, a mobile terminal, such as a cell phone, uses an X-Y coordinate system to describe a location of a point on its associated display screen. In operation, a user generally moves a cursor to a given point on the display screen and "clicks" an enter key. The mobile terminal may interpret the click of the enter key as a command to capture the X-Y coordinates of the cursor. For example, several icons may be displayed on the mobile terminal's display screen. Each icon may be associated with an application stored in a memory of the mobile terminal. The user may cause the cursor to hover over one of the icons. At this instant, the cursor's location and the location of at least one point within the perimeter of the icon share common coordinates; their locations coincide. This situation may be referred to as having the cursor "on" the icon. In this situation, when the user clicks the enter key of the mobile terminal, it may capture the X-Y coordinate location of the cursor. The captured cursor coordinates could be compared to the coordinates of all points within the perimeter of each of the icons on the display. If the location of the cursor coincides with the location of at least one point within the perimeter of one of the displayed icons, the mobile terminal may launch (i.e., "execute") the application associated with that icon.

The user, however, may not have the cursor on an icon when he or she clicks the enter key. In this situation, because the location of the cursor fails to coincide with the location of at least one point within the perimeter of any of the displayed icons, the mobile terminal will do nothing.

The desktops of mobile terminals are becoming crowded as mobile terminals shrink in physical size and as users add more functionality to their mobile terminals. The combination of at least these two factors may mean that more icons of a smaller size are being packed into a shrinking display area. As mobile terminals with advanced features, such as touch screens, downloadable movies, downloadable music, streaming live television programming and video conferencing features gain popularity, the problem of accurately locating a desired icon will increase.

When using a touch screen, good aim is required to correctly hit a desired icon with a stylus. The wrong application may be launched if the user's aim is off and he hits an unintended icon. Alternatively, no application will be launched if the user misses her icon and taps the empty desktop are between icons. In practice, because mobile terminals are often jostled as they are operated, a user's aim is directly impacted by the movement of the mobile terminal itself. If frustration is to be avoided and productivity is to be increased, users must have a way to reduce desktop clutter and receive an interesting and/or humorous outcome if their desired outcome (e.g., launching an application) does not materialize.

What is needed is an apparatus and method to cause icons to move about the display and to cause at least one icon on the display to move toward and/or around a selection point when the selection point falls on the desktop of the display, and not on an icon.

SUMMARY OF THE INVENTION

Accordingly, the present invention is directed to a mobile terminal, which may be a mobile terminal, providing a graphic user interface and method of providing the graphic user interface that substantially obviates one or more problems due to limitations and disadvantages of the related art.

In one embodiment of the invention, a method to provide a graphic user interface on a touch screen display of a mobile terminal may include displaying one or more icons associated with one or more applications of the mobile device on the touch screen display. The icons may be caused to move about the touch screen display in a pattern. A control unit may detect a designation of a point on the touch screen display, and if the designated point does not coincide with any point within a perimeter of any of the one or more icons the control unit may select at least one of the one or more icons based on a distance between the designated point and the at least one icon. Thereafter, a predefined action involving the at least one icon may be executed.

In another embodiment of the invention, a method of providing a graphic user interface on a touch screen display of a mobile terminal may include detecting a predefined event associated with an application of the mobile device and displaying an indicator icon on the touch screen display to indicate the detection of the event. Following the detection of the event the control unit may cause the pattern of movement of the icon associated with the application to change, such that the changed pattern of motion results in the icon's interception of the indicator icon. Thereafter the control unit may cause an animated event to be displayed, wherein the animated event depicts an animation of at least the icon associated with the application and the intercepted indicator icon.

Additional advantages, icons, and features of the invention will be set forth in part in the description which follows and in part will become apparent to those having ordinary skill in the art upon examination of the following or may be learned from practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flow diagram of another method in accordance with an embodiment of the invention.

DETAILED DESCRIPTION OF THE INVENTION

Reference will now be made to various embodiments of the invention, examples of which are illustrated in the accompanying drawings. Wherever possible, the same reference numbers will be used throughout the drawings to refer to the same or like parts. Embodiments of the invention for use with mobile terminals having touch screen displays may be described herein. The invention, however, may perform with equal satisfaction using either fixed or mobile displays, with or without touch screen display input.

Desktop environments exist for graphic user interfaces ("GUIs") on both fixed and mobile terminals. On a mobile terminal, a cursor's movement may be directed by, for example, rotating a wheel, manipulating a four-way key, or manipulating four individual directional buttons. Some mobile terminals use a touch screen as an input device. Data may be entered to the mobile terminal via the touch screen. Touch screen data input may be facilitated by use of a pointed instrument. A representative pointed instrument is a stylus. Other objects, such as a pen, pencil, or finger may be used. Pens and pencils, however, may leave marks on the touch screen. Fingers may be too large to select menu items, including icons, that are displayed in close proximity to one another. The term "touch screen device" is intended to encompass all input devices that accept data in a manner other than exclusively through the use of a keyboard. Touch screen devices may therefore encompass pressure sensitive, capacitive, heat sensitive, and light sensitive (e.g., functioning by breaking rows and columns of light) transducers to provide input to the mobile device.

Figure 1:
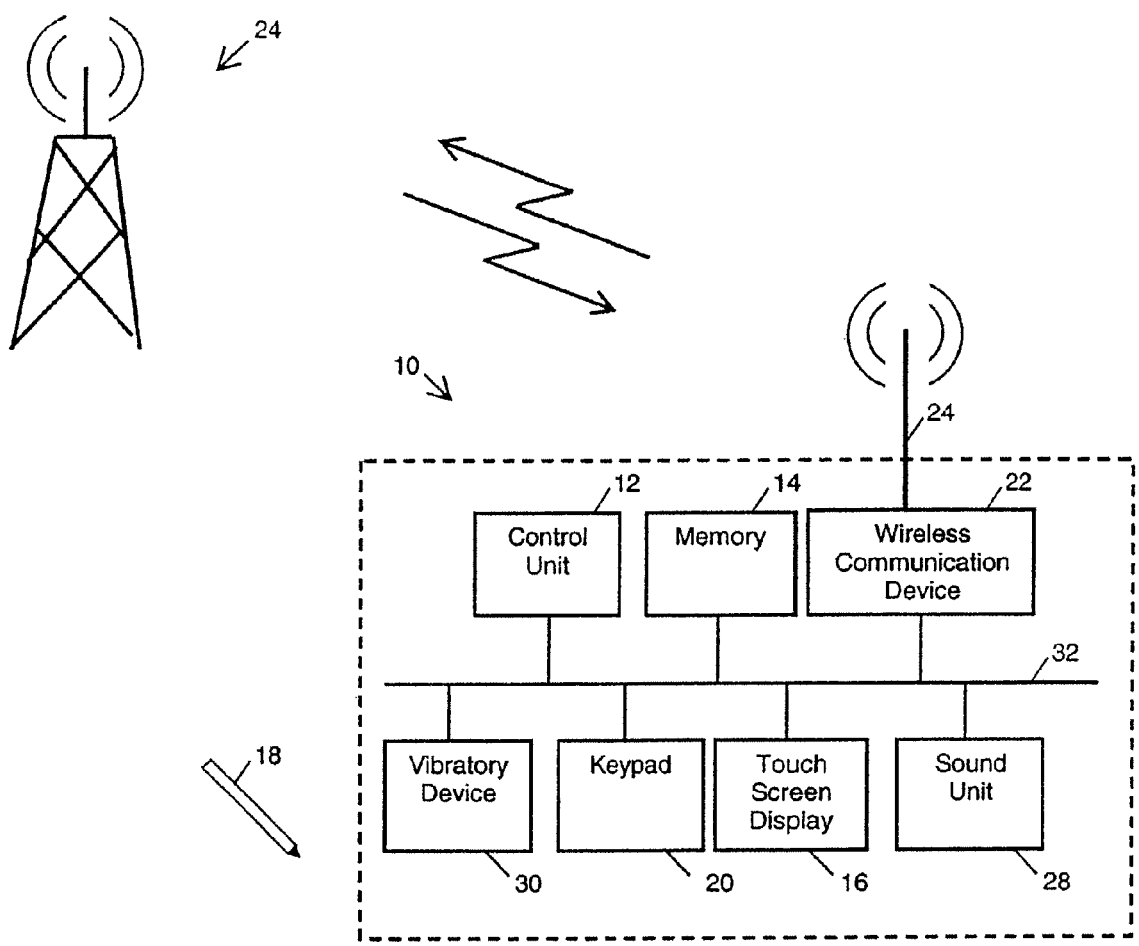
FIG. 1 is a block diagram of a mobile terminal that may provide a graphic user interface according to an embodiment of the invention.

FIG. 1 is a block diagram of a mobile terminal 10 that may provide a graphic user interface according to an embodiment of the invention. The mobile terminal 10 may include a control unit 12, such as a microprocessor or controller. The mobile terminal 10 may also include a memory 14, which may be used to store data and executable code associated with a method according to an embodiment of the invention. The mobile terminal 10 may also include a display 16 to display data/images according to commands generated by the control unit 12. The display 16 may be a touch screen display. The display 16 may therefore serve as at least one input/output device of the mobile terminal 10. A user may use the touch screen display 16 with an associated stylus 18 to input data to the mobile terminal 10. The mobile terminal 10 may also include one or more additional input devices, such as a keypad 20. A wireless communication transmitter/receiver device 22 and associated antenna 24 may be associated with the mobile terminal 10. The wireless communication device 22 may be useful for transmitting and/or receiving data to and/or from, respectively, a remote source 26. The data may be digital and/or analog. The remote source 24 may be a mobile base station or other intermediary point between the user's mobile terminal 10 and a fixed or mobile terminal (not shown) in communication with the user's mobile terminal. The mobile terminal 10 may also include a sound unit 28 that outputs sound. Sounds may be generated in response to a command from the control unit 12 and may provide an audible indicator for the user. The mobile terminal 10 may also include a vibratory device 30, which may be used to provide a tactile indicator to the user. The memory 14, touch screen display 16, keypad 20, wireless communication device 22, sound device 28, and vibratory device 30 may all be coupled to the control unit 12 via a communication bus 32.

The stylus 18, in cooperation with the touch screen display 16, may be used to control movement of a cursor, pointer, or the like. The stylus 18 may be used to designate a location of a point on the touch screen display 16 that may or may not coincide with the location of an icon. Of course, movement of the cursor or pointer, or designation of an icon or a point on the touch screen display 16 may be implemented using other items, such as a mouse, a touch pad, a joystick, a four-way key, or the like. Moreover, it will be understood that recitation of any lists herein is not meant to limit the invention to the items recited in the list; all lists are intended to be illustrative and not limiting.

Figure 2:
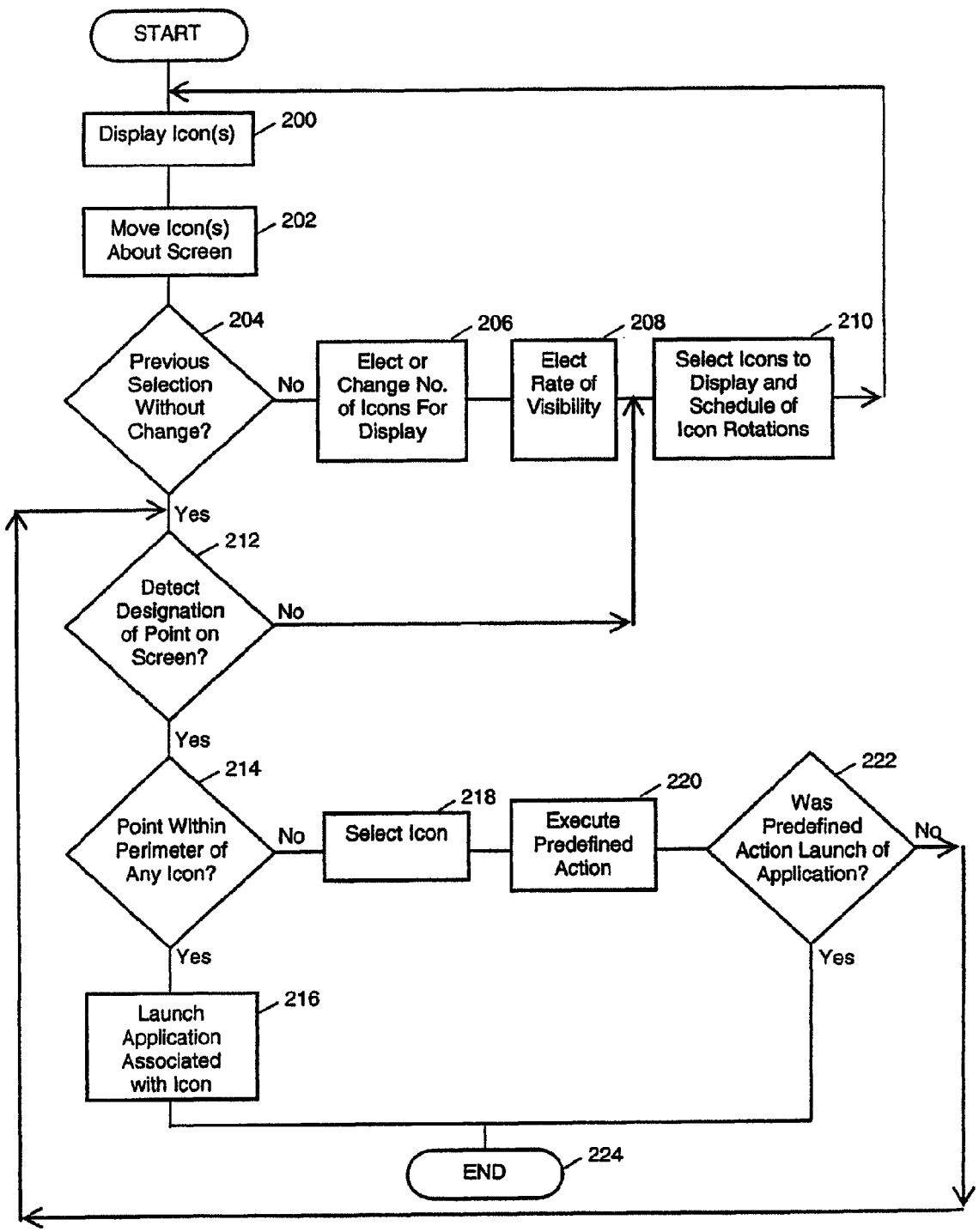
FIG. 2 is a flow diagram of one method in accordance with an embodiment of the invention.

FIG. 2 illustrates one method in accordance with an embodiment of the invention. At 200, the control unit 12 may execute instructions to display one or more icons on the touch screen display 16 associated with the mobile terminal 10. At 202, the control unit 12 may execute instructions to cause each of the one or more icons to move about the display screen in a pattern. The speed of any given icon's movement may be fixed or variable.

The pattern may be substantially fixed, for example, a straight or sinusoidal path along a horizontal, diagonal, or vertical axis; a circular or elliptical path; or any other substantially predictable pattern. The pattern may alternatively be pseudo-random, for example, an apparently random path taken by a bee flying from flower to flower, or an apparently random path of a fish as it swims in an aquarium. The pattern of movement of each of the one or more icons may be unique. That is, no two patterns repeat each other.

As there may be many icons moving about on the mobile terminal's desktop, the desktop may become crowded and visually confusing. A user may thus elect to have only a fixed number of icons visible at any one time. The fixed number of icons may be less than or equal to the total number of icons available. At 204, if the user has not previously limited the number of icons on display or if the user does not want to make a change to that number, then the method may proceed to 206. At 206, the user may elect the number of icons that should be moving about the touch screen display at any given time, or may change a previous election.

Of course, the user may wish to see all of the mobile terminal's icons over a given time period, in a rotating manner. Thus, the pattern of movement of each of the one or more icons may be calculated to cause certain ones of the icons to substantially disappear from the touch screen display from time to time. Accordingly, at 208, the user may enter a rate (e.g., three icons per 10 seconds) of icon visibility. Alternatively, a user may select an amount of time between cycles of groups, or individual ones of, icons. As used herein, a cycle may be the amount of time each icon is visible on the display screen of the mobile terminal (e.g., 20 seconds every minute). At 210, the order of "cycling" of icons in and out of visibility may be calculated by the control unit 12. Multiple icons, may be substantially visible on the touch screen display in any given time period.

An icon may disappear from view by, for example, reducing its size until it has substantially disappeared. The size reduction may make it appear as if the icon is moving deeper into the display, and thus moving further away from the user.

An icon may disappear from view by, for example, effectively moving the icon outside of the visible area of the touch screen along any of its borders. Of course, the above examples are not meant to be limiting in any way. The method may return to 200, where the next icon(s) in a cycle can be displayed. If, however, at 204, the election of the number of icons to display was previously made or no change to the election is desired, the method may continue to 212.

At 212, the control unit 12 may detect that the user has designated a point on the display 16. Typically, a user designates a point by tapping, or otherwise touching the screen of the touch screen device with his or her stylus. Detecting the user's designation of a point may require the evaluation of a control signal received, for example, by the control unit 12 as an input from the touch screen display 16.

If, at 212, the control unit does not detect the designation of a point then, the method may continue to 210. If, however, the control unit does detect the designation of a point then, the method may proceed to 214. At 214, the control unit 12 may determine if the designated point coincides with any point within the perimeter of an icon. If so, the method may proceed to 216 where the control unit 12 may execute code to launch the application associated with that icon. The word "application" is intended to have a broad meaning, including at least both a computer program assigned for a specific task or use and any function or sub-routine associated with that program. Thus, one icon on a desktop may be associated with a word processing program while a second icon may be associated with a spell checking function of that program.

In the instance where the designated point is located on the desktop itself, and not on any icon, then, at 218, the control unit 12 may select at least one of the icons then displayed on the display screen. The selection may be based, for example, on a distance between the designated point and the icon (e.g., the closest icon to the designated point may be selected). At 220, the control unit may then execute a predefined action involving the selected icon.

Predefined actions may not be executed unless certain values are satisfied; they may also be dependent on one or more values, such as distance between the designated point and the selected icon. For example, the predefined action might only be executed when the distance between the designated point and the selected icon is less than a predetermined value. In this way, the user can determine (by setting the predetermined value) how carefully he must aim his stylus at the icon.

A predefined action may cause, for example, the pattern of movement of the selected icon to change. The pattern of movement of the selected icon may change, for example, to a circular pattern of motion substantially centered on the designated point on the screen.

The predefined action may alternatively or additionally involve changing a visual characteristic associated with the selected icon. Examples of visual characteristics that may be changed include size, color, shape, an animated feature of the icon, such as flapping of fins, wings, or arms, the running movement of legs, or shaking of all or part of the icon. Additionally, at 220, the predefined action may also include generating a sound.

Of course, the user may also set the predefined action to cause the launching of the application associated with the selected icon. In this event, the method may proceed to 224 and end. If the predefined action is not the launch of the application associated with the icon, then at 222 the method may return to 212 and continue as described above.

FIGS. 3A to 3E represent an illustrative sequence of exemplary screen shots of a mobile terminal performing one embodiment of the method of FIG. 2. For illustrative purposes, the icons of FIGS. 3A to 3E are represented as fish, and the user's perspective is from above. It will be understood that the icons could be represented, for example, as any life form, abstract shape, regular shape, inanimate object, photographic image, or any combinations of these and/or other categories of things. The shape and diversity of icons is not a limitation of the invention disclosed herein. In one non-limiting example, icons may be configured with an object oriented programming ("OOP") module. Likewise, the user's perspective is not limited to that illustrated in the figures presented herein.

Figure 3A:
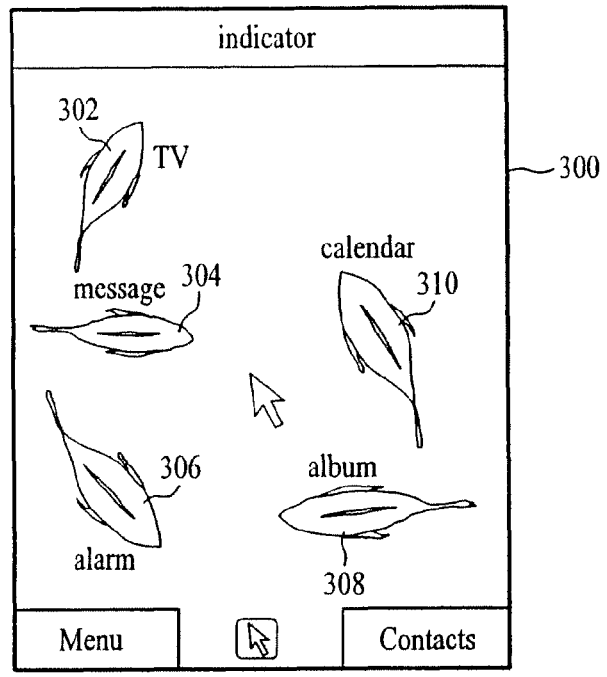
FIGS. 3A to 3E represent an illustrative sequence of exemplary screen shots of a mobile terminal performing one embodiment of the method of FIG. 2.

In FIG. 3A, the control unit 12 of the mobile terminal 10 has caused a plurality of icons 302, 304, 306, 308, 310 to be displayed on the touch screen display 300. In the example of FIGS. 3A-3E, three icons 302, 304, and 310 may be associated with applications stored on the mobile terminal (television, messaging, and calendar, respectively). One icon 306, providing an alarm, may be a associated with function of the messaging icon 304. Another icon 308, may provide a link to an album of photographs stored in the memory 14 of the mobile terminal 12. For purposes of this example, it may be assumed that the control unit 12 has additionally caused the displayed icons to move about the touch screen display 300. It may be assumed, for purposes of this example, that out of a plurality of icons, the user has set parameters that allow about five icons to be displayed at any given time. Accordingly, one or more of the icons moving about the display would, within a given time period, disappear from the screen and be replaced by other icons representing other applications. The methods of disappearance and appearance may be made, for example, by any one or combination of the methods described above.

Figure 3B:
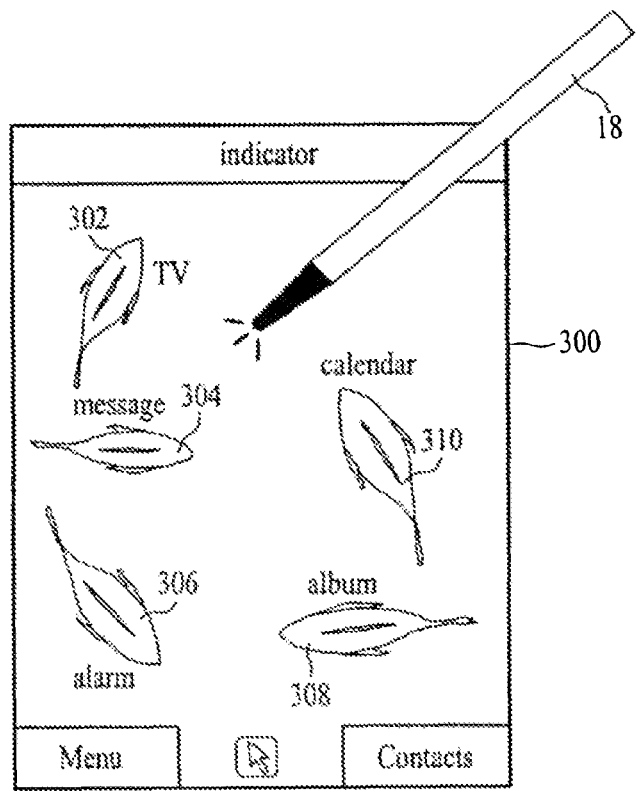

In FIG. 3B, a stylus 18 is illustrated as tapping or otherwise touching the surface of the touch screen 300 of the mobile terminal 10. By plan or by accident, the user's stylus has touched the display 300 at a point that is not occupied by an icon. The control unit 12 may detect and decode this touch as a designation of the X-Y coordinate of the cursor. The control unit 12 may select at least one icon according to a predetermined algorithm.

Figure 3C:
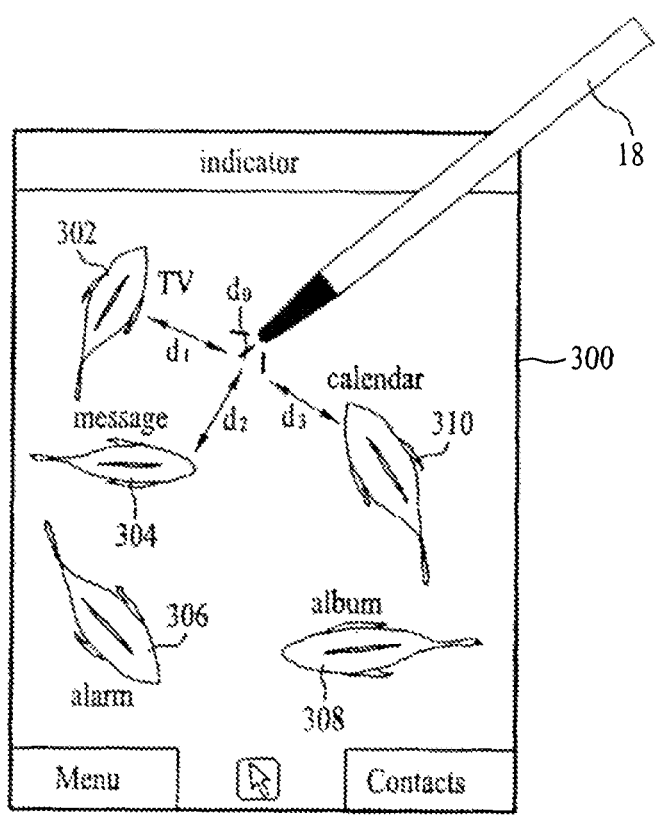

In FIG. 3C, the control unit 12 may calculate the distance ($d_1$, $d_2$, $d_3$) from the designated point ($d_0$) to each of the closest icons. In the example as illustrated in FIG. 3C, the distances to each icon 302, 304, and 310 are equivalent. Thus, the control unit 12 may select all three icons.

Figure 3D:
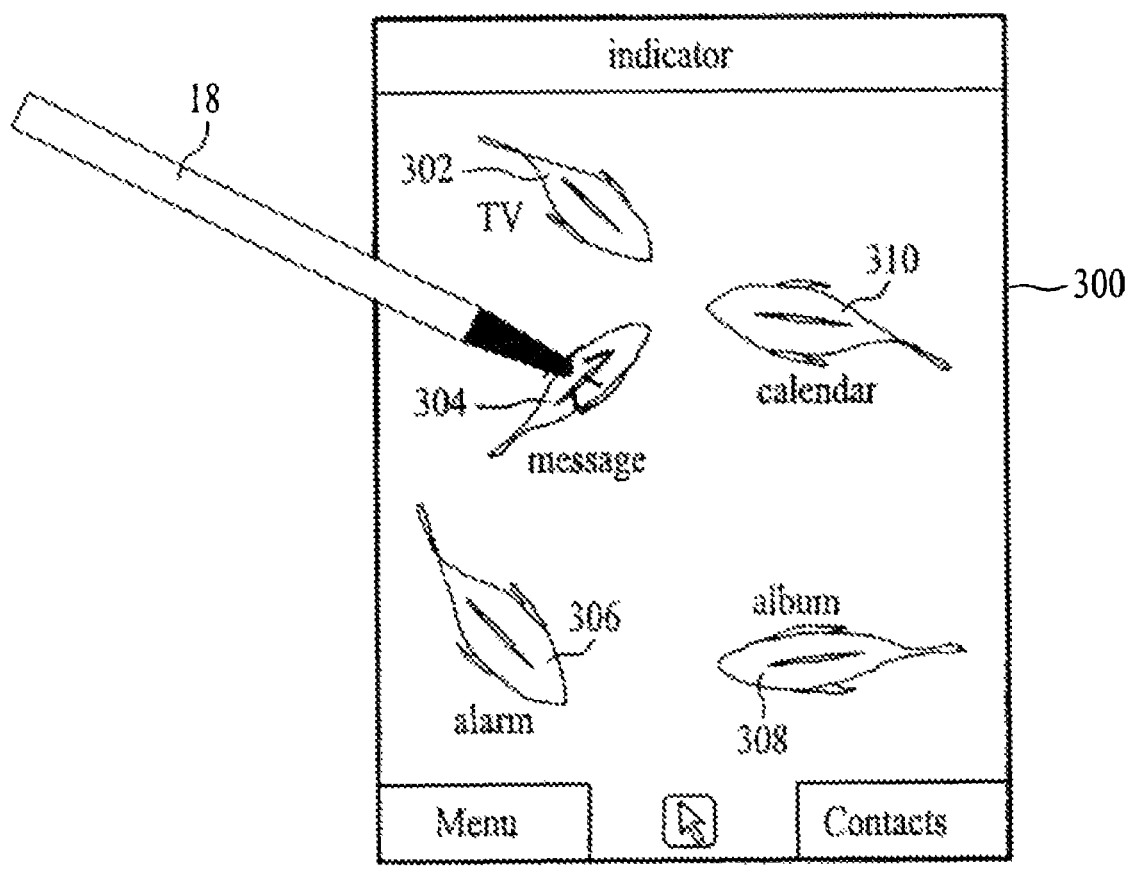
Figure 3E:
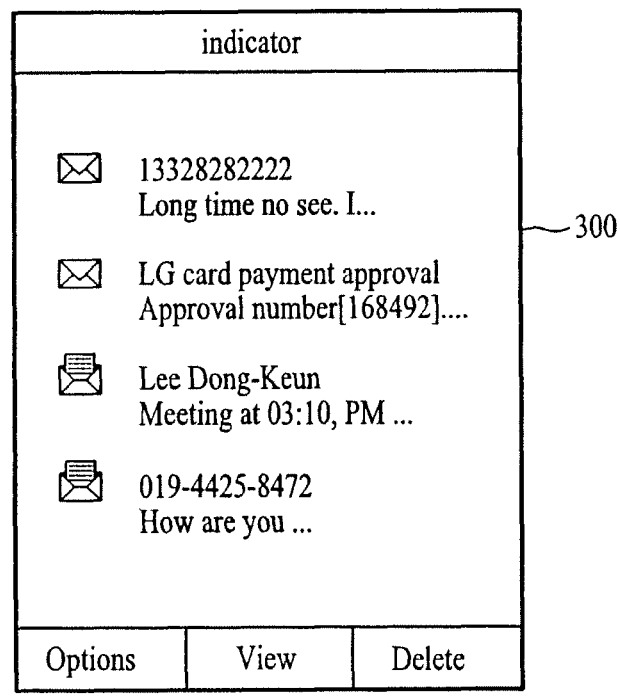

FIG. 3D illustrates the execution of one possible predefined action by each of the three icons. As illustrated, the predefined action may be to align each selected icon with the designated point ($d_0$) such that the "front" of the icon faces the designated point and the "rear" of the icon extends in a radial direction outward from the designated point. The execution of this predefined action may provide a benefit in that three moving icons have moved to one location on the display. This grouping of icons may make it easier for the user to select the icon representing a desired application. FIG. 3D illustrates the user's selection of the icon associated with the message application 304. FIG. 3E illustrates one example of a launched message program.

FIG. 4 is a flow diagram of another method in accordance with an embodiment of the invention. Steps 200 through 210 of FIG. 2 are repeated in the embodiment of FIG. 4. Disclosure of these steps is described above, in relation to FIG. 2. At 412, a predefined event may be detected. Examples of predefined events include a reception of a message, for example, a message broadcast from remote source 24 (FIG. 1). Another example of a predefined event may be a message or warning generated by the mobile terminal, for example, a low battery signal. Still another example of a predefined event may be associated with an application running on the mobile terminal, for example, the control unit 12 may detect the setting of a flag by the calendar application; the flag may indicate that a predetermined alarm time has been reached.

The predefined event may be associated with a first application of the one or more applications of the mobile device. At 414, upon detection of the predefined event, the control unit 12 may cause an indicator icon to be displayed on the touch screen display. The indicator icon may provide a visual indication of the detection of the event. Substantially simultaneously, at 416, the icon associated with the first application is caused to appear (if not already displayed on the screen). At 418, the icon associated with the first application is caused change its pattern of movement such that the path taken by the icon associated with the first application intercepts the indicator icon. Alternatively, both icons could be made to intercept each other. At 420, upon interception, the control unit 12 may cause a visual interaction between the icon associated with the first application and the intercepted indicator icon to occur. Such an interaction may be referred to as an "animated event."

Figure 5A:
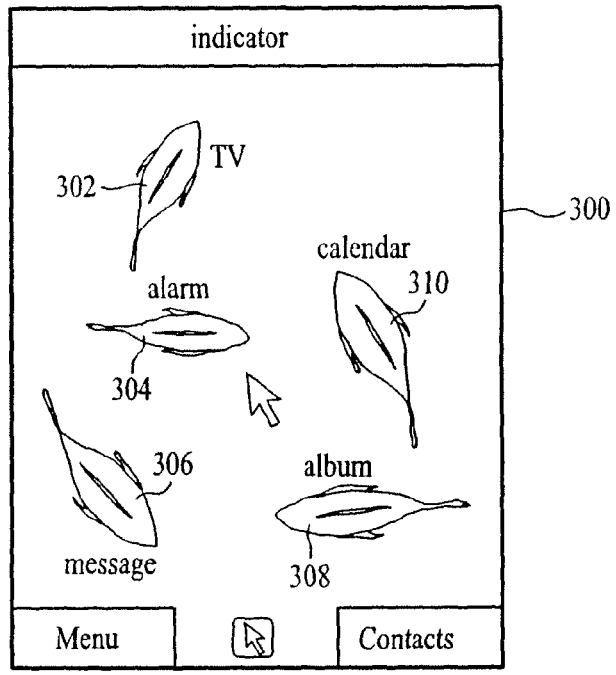
FIGS. 5A to 5E represent an illustrative sequence of exemplary screen shots of a mobile terminal performing one embodiment of the method of FIG. 4.

FIGS. 5A to 5E represent an illustrative sequence of exemplary screen shots of a mobile terminal performing one embodiment of the method of FIG. 4. In FIG. 5A, the control unit 12 of the mobile terminal 10 has caused a plurality of icons 302, 304, 306, 308, 310 to be displayed on the touch screen display 300.

Figure 5B:
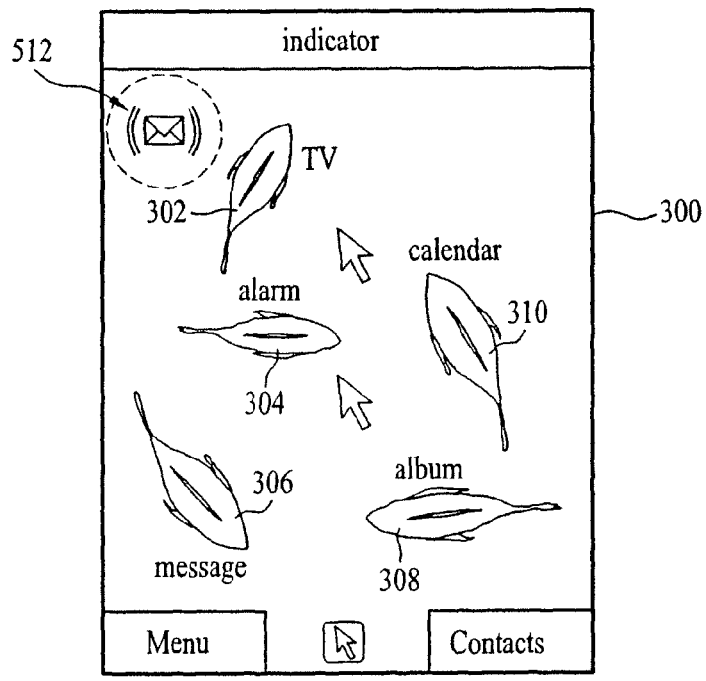

In FIG. 5B, the control unit 12 has detected an event. The event may be decoded as a reception of a message, for example, from remote source 24. An indicator icon 512 representing the event may be displayed at a prescribed position on the screen 300. In the example of FIG. 5B, an envelope-type icon is displayed on an upper left corner of the screen 300 to indicate a reception of the message.

Figure 5C:
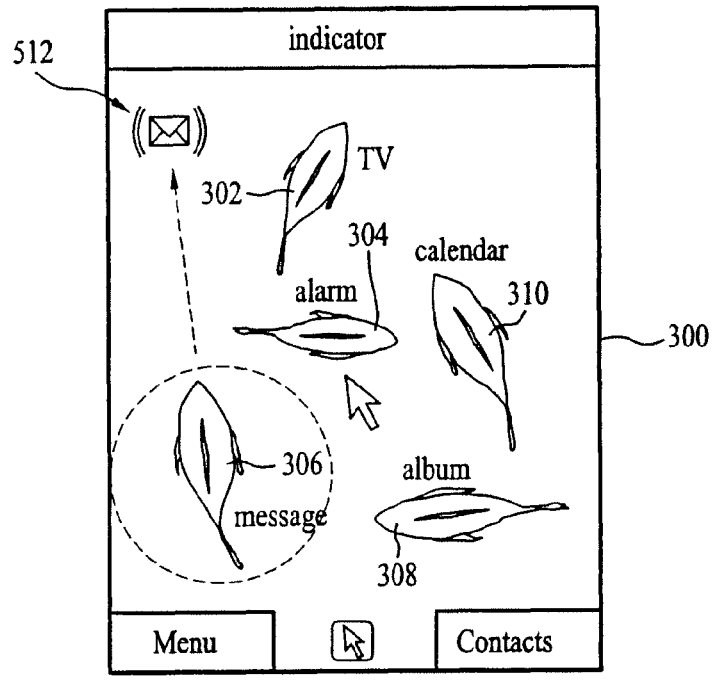
Figure 5D:
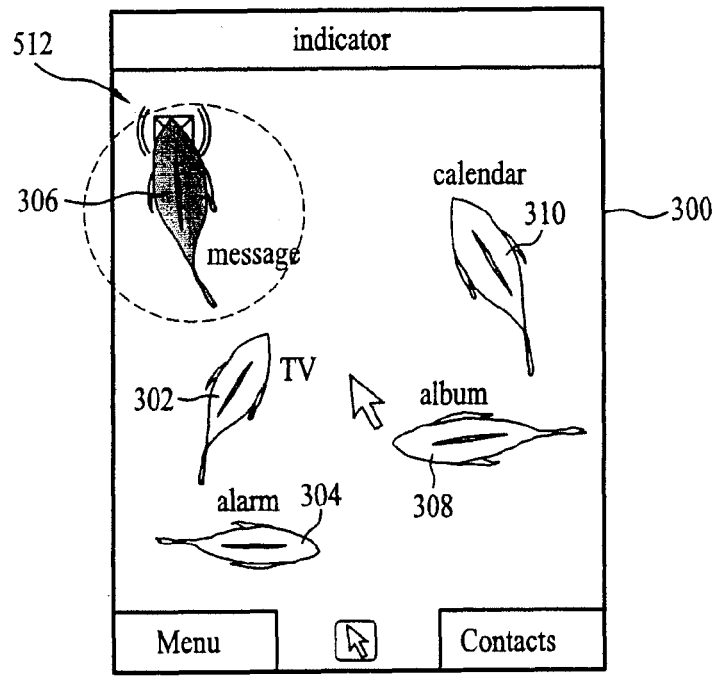
Figure 5E:
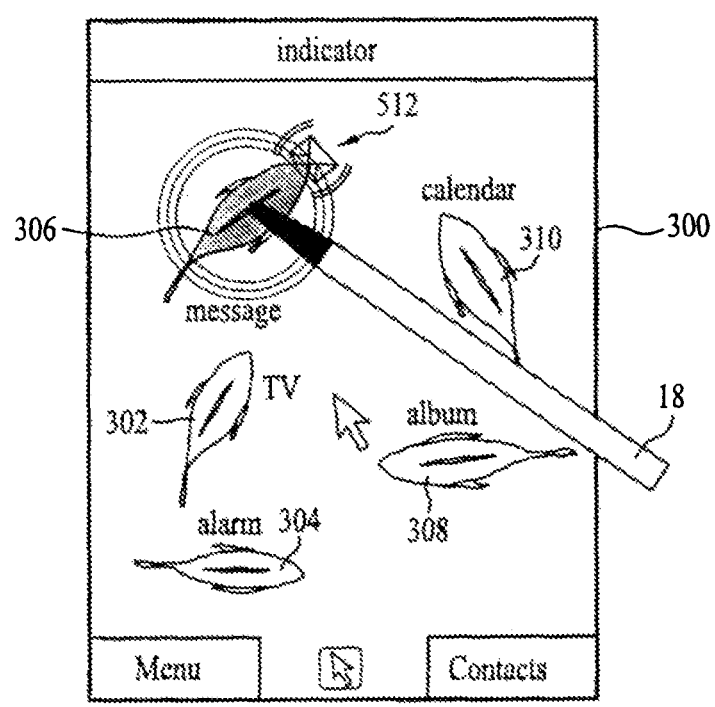

In FIG. 5C, the icon 306 for message application associated with the envelope type icon (i.e., the indicator icon 512) is illustrated as moving toward an intercept point with the indicator icon 512. FIG. 5D illustrates a state in which the icon representing the message application 306 intercepts the icon indicating the message reception 512. The control unit 12 may cause the intercepted pair of icons to perform some animated stunt, or may cause the intercepted icons to continue to move about the screen in a coupled position. For example, the fish's eye(s), mouth, and/or gill(s), may move and/or the fish's body may undulate, shake or wiggle. The envelope may, for example, increase or decrease in size, change color, and/or it's sealing flap may open and close. If the event was an alarm and the indicating icon was an alarm clock, then, for example, the alarm clock may vibrate, shake, spin its arms, and/or radiate curved lines to visually depict an alarm sound. Of course these lists are meant to be illustrative and in no way limiting. FIG. 5E illustrates that the user may select to receive and open the message by designating a point on the icon 306 (or indicator icon 512).

It will be apparent to those skilled in the art that various modifications and variations may be made without departing from the spirit or scope of the invention as illustrated by the exemplary embodiments described herein. Thus, it is intended that the present invention covers the modifications and variations of this invention provided they come within the scope of the appended claims and their equivalents.

What is claimed is:

1. A method of displaying a moving object in a mobile communication terminal, comprising:
    displaying a plurality of moving objects on a touch screen, wherein each of the moving objects keeps moving even when there is no user input, and wherein each of the moving objects has a unique pattern of movement that is different from the patterns of movement of the rest of the plurality of moving objects;
    detecting a pointer touching the touchscreen; and
    changing the pattern of the movement of each of the moving objects such that the moving objects move towards a touched location on the touchscreen,
    wherein prior to detecting the touched pointer, a head of each of the moving objects is directed in an arbitrary direction according to its unique pattern, and
    wherein after detecting the touched pointer, the head of each of the moving objects turns to face toward the touched location and a tail of each of the moving objects turns to extend in a radial direction outward from the touched location.

2. The method of claim 1, wherein the moving objects are in a shape of fish.

3. The method of claim 1, wherein a specific one of the moving objects represents a predefined event in the mobile communication terminal, the predefined event being irrespective of a user input, and wherein the method further comprises changing an appearance of the specific moving object when the predefined event occurs in the mobile communication terminal.

4. The method of claim 3, wherein the predefined event is one of a low battery and a message reception.

5. The method of claim 3, wherein changing the appearance of the specific moving object includes changing a color of the specific moving object.

6. The method of claim 1, wherein each of the moving objects moves at a variable speed.

7. The method of claim 1, wherein the number of the plurality of moving objects is increased or decreased during the movement of the moving objects.

8. The method of claim 7, wherein at least one of the plurality of moving objects appears from time to time regardless of a user input.

9. The method of claim 1, wherein the moving objects move in the touch screen as if the moving objects were moving in a 3-dimensional space.

10. The method of claim 1, wherein each of the moving objects represents a respective function, and when one of the moving objects is touched by the pointer, a function corresponding to the touched moving object is executed.

11. The method of claim 1, wherein the number of the plurality of moving objects to be displayed on the touch screen can be limited by a user's setting.

12. A mobile communication terminal comprising:
    a memory configured to store moving objects;
    a touchscreen configured to display a plurality of moving objects, wherein each of the moving objects keeps moving even when there is no user input, and wherein each of the moving objects has a unique pattern of movement that is different from the patterns of movement of the rest of the plurality of moving objects, and to detect a pointer touching the touchscreen; and
    a controller configured to change the pattern of the movement of each of the moving objects such that the moving objects move towards a touched location on the touchscreen,
    wherein prior to detecting the touched pointer, a head of each of the moving objects is directed in an arbitrary direction according to its unique pattern, and
    wherein after detecting the touched pointer, the head of each of the moving objects turns to face toward the touched location and a tail of each of the moving objects turns to extend in a radial direction outward from the touched location.

13. The terminal of claim 12, wherein the moving objects are in a shape of fish.

14. The terminal of claim 12, wherein a specific one of the moving objects represents a predefined event in the mobile communication terminal, the predefined event being irrespective of a user input, and wherein the controller is further configured to change a color of the specific moving object when the predefined event occurs in the mobile communication terminal.

15. The terminal of claim 14, wherein the predefined event is one of a low battery and a message reception.

16. The terminal of claim 12, wherein the controller is further configured to move each of the moving objects at a variable speed.

17. The terminal of claim 12, wherein the number of the plurality of moving objects is increased or decreased during the movement of the moving objects.

18. The terminal of claim 17, wherein at least one of the plurality of moving objects appears from time to time regardless of a user input.

19. The terminal of claim 12, wherein the moving objects move in the touch screen as if the moving objects were moving in a 3-dimensional space.

* * * * *